United States Patent [19]

Bürker et al.

[11] 3,781,825

[45] Dec. 25, 1973

[54] PROGRAMMABLE FIXED DATA MEMORY UTILIZING SCHOTTKY DIODES

[75] Inventors: Ulf Bürker; Sigurd Koch, both of Munich, Germany

[73] Assignee: Siemens Aktiengesellschaft, Berlin and Munich, Germany

[22] Filed: May 10, 1971

[21] Appl. No.: 141,725

[30] Foreign Application Priority Data

May 12, 1970 Germany.................. P 20 23 219.3

[52] U.S. Cl. 340/173 SP, 317/235 UA, 317/234 AE
[51] Int. Cl.... G11c 7/00, G11c 11/34, G11c 17/00
[58] Field of Search.............................. 340/173 SP; 317/235 UA, 235 AE

[56] References Cited

UNITED STATES PATENTS

| | | | |
|---|---|---|---|
| 3,576,549 | 4/1971 | Hess | 340/173 SP |
| 3,245,051 | 4/1966 | Robb | 340/173 SP |
| 3,641,516 | 2/1972 | Castrucci | 340/173 SP |

OTHER PUBLICATIONS

Abbas, Electrically Encodable Read–Only Store, 11/70, IBM Technical Disclosure Bulletin, Vol. 13, No. 6, p. 1428

Anantha, Fabricating Schottky Barrier Photodiodes and Diode Arrays, 6/69, IBM Technical Disclosure Bulletin, Vol. 12, No. 1, pp. 11–12

Anacker, $Nb_2O_5$ Memory Cell, 10/70, IBM Technical Disclosure Bulletin, Vol. 13, No. 5, pp. 1189–1190

Simon, Read–Only Memory, 5/70, IBM Technical Disclosure Bulletin, Vol. 12, No. 12, p. 2127

Electronics, Mass–Produced Read–Only Memory is Custom Wired After Assembly. August 18, 1969, pp. 195–196

*Primary Examiner*—Terrell W. Fears
*Assistant Examiner*—Stuart Hecker
*Attorney*—Curt M. Avery, Arthur E. Wilfond, Herbert L. Lerner and Daniel J. Tick

[57] ABSTRACT

A memory element comprises two series-connected and series-opposed Schottky diodes. A middle electrode is provided between the Schottky diodes. To effect programming, the Schottky diode which is operated at reverse voltage is short-circuited to the middle electrode through the formation of a breakthrough channel.

9 Claims, 9 Drawing Figures

PROGRAMMABLE FIXED DATA MEMORY UTILIZING SCHOTTKY DIODES

DESCRIPTION OF THE INVENTION

The invention relates to a programmable fixed data memory on a semiconductor base. More particularly, the invention relates to a programmable fixed data memory utilizing Schottky diodes.

"Electronics" magazine of Aug. 18, 1969 discloses semiconductor fixed data memories on pages 195 and 196. The individual memory elements of the memories comprise two diodes connected in series and in series opposition. The diodes are conventional semiconductor diodes each having a pn junction. For entering data or information, a single diode of a memory element will breakthrough through the application of a voltage pulse. As a result, other conductivity conditions will occur in the thus characterized memory elements, than in memory elements having diodes to which a voltage pulse has not been applied.

In contrast, the object of the invention is to provide a fixed data memory which is rapid in operation and easy to program.

In accordance with the invention, the individual memory elements consist of Schottky diodes.

The use of Schottky diodes for individual memory elements offers a high speed of operation of the entire memory, since the memory or storage time of a Schottky diode is negligible.

The Schottky effect is an increase in anode current of a thermionic tube beyond that predicted by the Richardson equation, due to lowering of the work function of the cathode when an electric field is produced at the surface of the cathode by the anode. The Schottky effect is described on pages 68 and 69 of the McGraw-Hill Encyclopedia of Science and Technology Volume 12, 1960, McGraw-Hill Book Company, Inc. and on page 8–77 of the Handbook of Physics, Edited by E. U. Condon and H. Odishaw, 1958, McGraw-Hill Book Company, Inc. The Schottky exhaustion layer theory is describd on page 8–61 of the aforedescribed Handbook of Physics.

Another feature of the invention provides that to form the memory element, a semiconductor layer of one conductivity type is provided with two metal conductors or Schottky diodes which are spaced from each other and are electrically separated or insulated from each other. Another metal conductor having an ohmic contact with the semiconductor layer is provided between both metal conductors.

The aforedescribed memory element has a simple structure. In addition, it is easy to program the memory, because one of the Schottky diodes is electrically short-circuited by a shunt. This happens as a result of the application of a current pulse which causes a breakthrough channel to form on the surface of the semiconductor body between the metal conductor or anode of the Schottky diode operated in the reverse direction and the other metal conductor or cathode.

Other features and details of the invention may be derived from the following description of two embodiments. In order that the invention may be readily carried into effect, it will now be described with reference to the accompanying drawings, wherein.

In the FIGS. the same components are identified by the same reference numerals.

Figure 1:
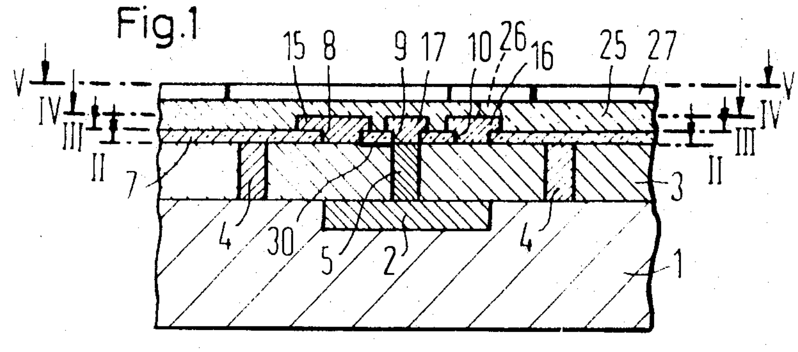
FIG. 1 is a sectional view of an embodiment of a memory element, taken along the lines I—I of FIG. 5.
Figure 2:
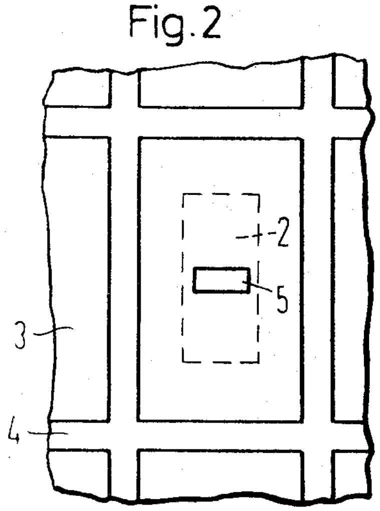
FIG. 2 is a sectional view, taken along the lines II—II of FIG. 1.
Figure 3:
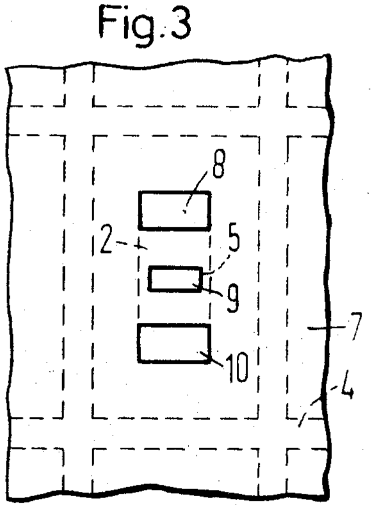
FIG. 3 is a sectional view, taken along the lines III—III of FIG. 1.

In FIG. 1, the memory comprises a semiconductor substrate 1 of *p* conductivity type. The surface of the substrate 1 is provided with a zone 2 which is strongly *n* doped and is of *n* conductivity type. The zone 2 serves as a buried layer, in the finished memory element. The zone 2 and the semiconductor substrate 1, are provided with a semiconductor layer 3 of *n* conductivity type. The semiconductor layer 3 consists of epitactically applied silicon. It has a specific resistance of 0.1 to 1 ohm.

The semiconductor layer 3 is provided with insulating walls 4 which are strongly *p* doped and are of *p* conductivity type. The insulating walls 4 serve to electrically insulate each memory element from adjacent memory elements. Furthermore, a region 5 which is strongly *n* doped and is of *n* conductivity type is provided in the semiconductor layer 3. The region 5 extends up to the zone 2 and is enclosed, with clearance, by the insulating walls 4.

An electrically insulating layer 7, comprising a dielectric material, covers the semiconductor layer 3. The electrically insulating layer 7 may comprise silicon dioxide, for example. Contact holes, apertures, bores, windows, or the like, 8, 9 and 10, extending to the semiconductor layer 3, are formed in the insulating layer 7.

An aluminum conductor path or electrical conductor 15 is in electrical contact with the semiconductor layer 3 through the contact hole 8, thus forming a first Schottky diode. An aluminum conductor or conductor path 16 is also in electrical contact with the semiconductor layer 3 through the contact hole 10, thus forming a second Schottky diode at the junction between the conductor metal and the semiconductor material. An aluminum conductor or conductor path 17 is also in electrical contact with the semiconductor layer 3 through the contact hole 9, above the highly doped $n^+$ zone 5. The conductor 17 forms, as a common cathode conductor, a middle electrode, and is in ohmic contact with the semiconductor layer 3.

Figure 4:
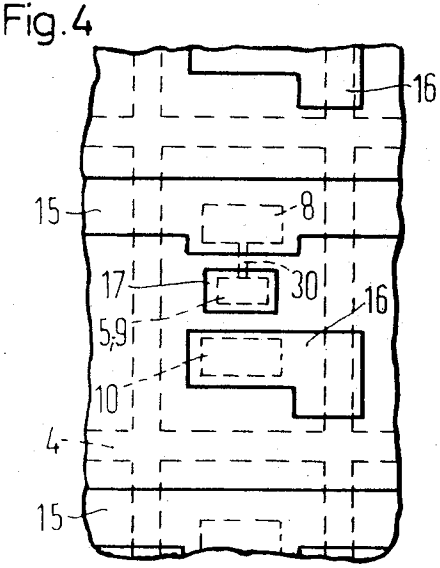
FIG. 4 is a sectional view, taken along the lines IV—IV of FIG. 1.

As shown in FIG. 4, the conductors 15 are guided or extend in horizontal direction. The conductors 16 which with the semiconductor layer 3 form the second Schottky diode in the contact hole 10, should also be guided with several memory elements or extend to the edge of the entire memory. Since this requires cross-overs with the conductors 15, another insulating layer 25 is, first, provided on the insulating layer 7. The insulating layer 25 covers the conductors 15 and the middle electrodes or conductors 17.

Figure 5:
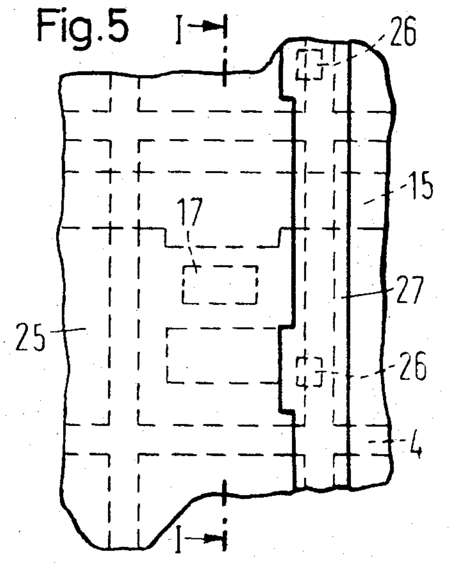
FIG. 5 is a top view of the embodiment of FIGS. 1 to 4, taken along the lines V—V of FIG. 1.

The insulating layer 25 is provided with a window 26 to the conductor 16. The window 26 is shown in broken lines in FIG. 1. Electrical conductors or conductors 27 are provided in contact with the conductor 16 through the window 26 and extend on the insulating layer 25. FIG. 5 shows that the conductors 27 extend in perpendicular direction to the conductors 15. The conductors 27 and 15 are electrically separated from each other by the insulating layer 25.

The memory element is programmed by short-circuiting one of the two Schottky diodes, by means of a current surge. The voltage applied to the conductors 15 and to the conductors 16 and 27 is selected so high that an avalanche breakthrough occurs at the blocked diode. The first Schottky diode formed by the conductor 15 and the semiconductor layer 3 should be operated in reverse direction, for example. The potential of the middle electrode 17 will then be, during the avalanche breakthrough one Schottky diode threshold voltage below the potential of the anode conductor 16 of the second Schottky diode.

The second Schottky diode is poled in the forward direction and the potential comes from the conductor 16 and the semiconductor layer 3. The predominant part of the applied voltage drops at the blocked first Schottky diode. The power dissipation which occurs at the boundary of the first diode effects a melting of the metallization and a spontaneous alloying-through of a breakthrough channel 30 (FIGS. 1, 4) in the direction of the greatest field strength or intensity toward the middle electrode 17.

The path resistance of the non-short-circuited Schottky diode enters directly into the switching time of the memory element and determines the same. In order to reduce the path resistance, and thereby also the switching time, the buried layer zone 2 is produced by diffusion prior to the epitactic application of the semiconductor layer 3. The same purpose is served by the region 5, which is produced by diffusion which is strongly doped and deep-reaching and which simultaneously produces an ohmic contact to the middle electrode 17.

The provision of the middle electrode 17 insures that when the current pulse is applied, one, and only one, Schottky diode is short-circuited.

FIGS. 6 to 9 disclose a second embodiment of the invention. In FIGS. 6 to 9, the electrically conductive leads for the individual memory elements extend in two planes with the insulating layer 25 eliminated.

Figure 6:
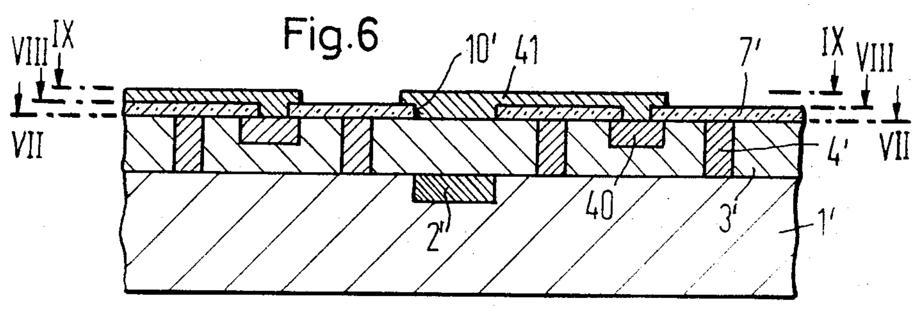
FIG. 6 is a sectional view of another embodiment of a memory element, taken along the lines VI—VI of FIG. 9.
Figure 7:
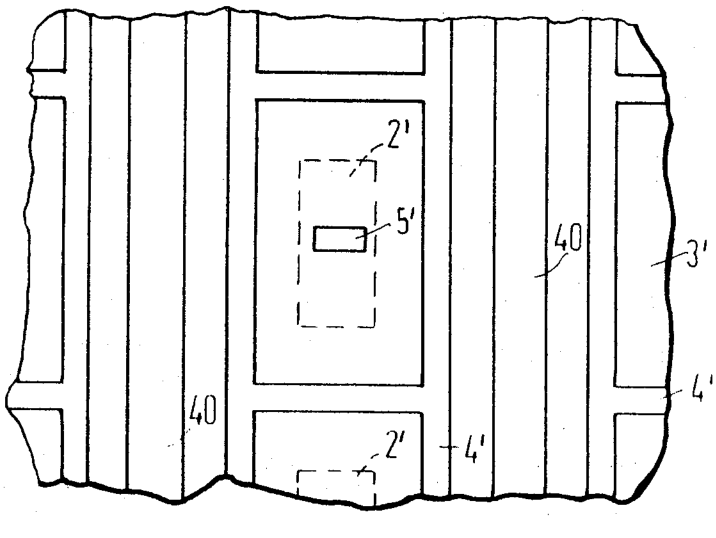
FIG. 7 is a sectional view, taken along the lines VII—VII of FIG. 6.
Figure 8:
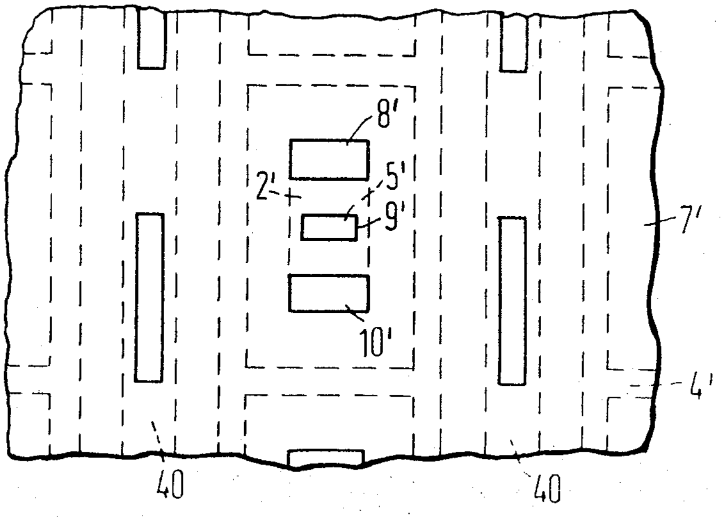
FIG. 8 is a sectional view, taken along the lines VIII—VIII of FIG. 6.
Figure 9:
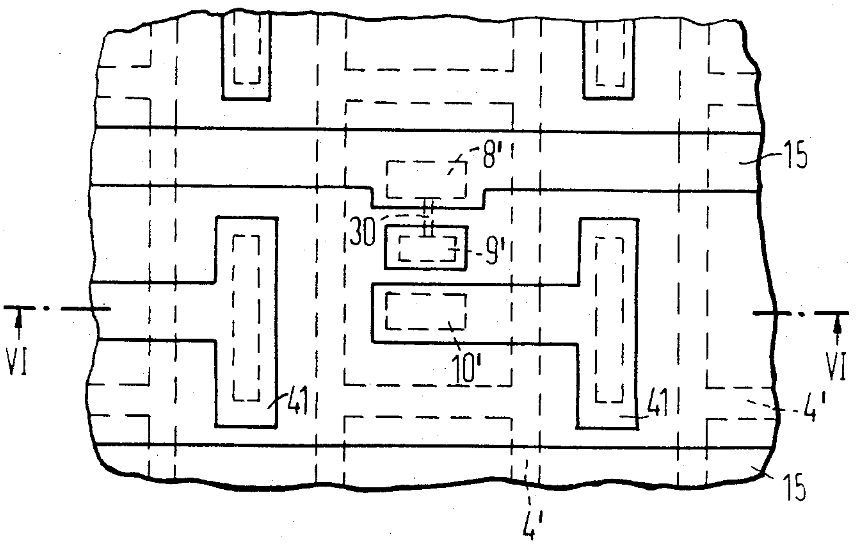
FIG. 9 is a top view of the embodiment of FIGS. 6 to 9, taken along the lines IX—IX of FIG. 6.

Corresponding parts in FIGS. 6 to 9 have the same reference numerals as in FIGS. 1 to 5, but are primed. The sectional view of FIG. 6, contrary to the sectional view of FIG. 1, is perpendicular to the connecting direction between both Schottky diodes, so that only one Schottky diode is illustrated in FIG. 6.

In FIG. 6, the conductor 27 of FIG. 1 is replaced by a channel 40 of $p^+$ conductivity type. The channel 40 extends outside the memory element sealed by the insulating walls. The channel 40 is connected through a conductor or conductor path 41, via the contact hole 10', to one Schottky diode. The other Schottky diode is formed in the contact hole 8', between the conductor 15 (FIG. 9) and the semiconductor layer 3.

The programming is effected just as hereinbefore described with reference to the embodiment of FIGS. 1 to 5. The breakthrough channel 30 forms between the middle electrode 17 and one of the two Schottky diodes (FIG. 4). The reverse voltage between the channel 40 and the memory element is greater than the voltage required for producing the breakthrough channel 30, since two greatly blocking pn junctions are positioned between both channels (the channel 40 and the semiconductor layer 3', and the insulating wall 4', and the semiconductor layer 3').

While the invention has been described by means of specific examples and in specific embodiments, we do not wish to be limited thereto, for obvious modifications will occur to those skilled in the art without departing from the spirit and scope of the invention.

We claim:

1. A programmable fixed data memory for use in an integrated circuit comprising a semiconductor substrate, a semiconductor layer of one conductivity type on said substrate, a strongly doped buried semiconductor layer at the surface of said semiconductor substrate beneath said semiconductor layer, said semiconductor layer and said buried semiconductor layer being of the same conductivity type, Schottky diodes each having a metal conductive contact with the semiconductor layer, said Schottky diodes having two metal conductive contacts on said semiconductor layer, said metal conductive contacts being spaced from one another and being electrically insulated from one another, a third metal conductor and conductive contact in ohmic contact with said semiconductor layer between and insulated from said two conductive contacts, an insulating wall of the opposite conductivity type from said semiconductor layer provided in said semiconductor layer for insulating said Schottky diodes in said integrated circuit, an insulating layer on said semiconductor layer, electrically conducting metal leads in electrical contact with said metal conductive contacts forming said Schottky diode, and a breakthrough channel formed between one of said two metal conductive contacts and said third conductive contact along the surface of said semiconductor layer for providing programming, said breakthrough channel being formed by applying a current surge to shortcircuit one of said Schottky diodes, said third conductor being arranged to insure that when said current surge is applied, that only one of said Schottky diodes is short-circuited.

2. A programmable fixed data memory element having a semiconductor substrate 1 and always comprising two oppositely connected diodes and programmed by short-circuiting one of the diodes, said data memory element comprising a semiconductor layer 3 of one conductivity type on the substrate 1; Schottky diodes each having a metal conductive contact with the semiconductor layer 3, two metal conductive contacts 15, 16 of the Schottky diodes being provided on the semiconductor layer 3 and spaced at a distance from each other and electrically insulated from each other; a third metal conductive contact 17 in ohmic contact with the semiconductor layer 3 between and insulated from said two conductive contacts of said Schottky diodes; and a breakthrough channel 3 formed between one of the two metal conductive contacts of said Schottky diodes and the third contact 17 along the surface of the semiconductor layer 3 for providing programming.

3. A fixed data memory as claimed in claim 2, further comprising a strongly doped buried semiconductor layer at the surface of the semiconductor substrate beneath the semiconductor layer, the semiconductor layer and the buried semiconductor layer being of the same conductivity type.

4. A fixed data memory as claimed in claim 3, further comprising an insulating wall of the opposite conductivity type from the semiconductor layer enclosing said semiconductor layer for insulating a memory element in an integrated circuit.

5. A fixed data memory as claimed in claim 3 further comprising an insulating layer on the semiconductor layer and an insulating wall in the semiconductor layer.

6. A fixed data memory as claimed in claim 5, further comprising electrically conducting metal leads in electrical contact with the metal conductive contacts forming a Schottky diode, a second insulating layer on the first said insulating layer, said leads extending in two planes separated by said second insulating layer.

7. A fixed data memory as claimed in claim 5, further comprising electrically conducting metal leads in electrical contact with the metal conductive contacts forming a Schottky diode, said leads extending in two planes.

8. A fixed data memory as claimed in claim 7, further comprising a strongly doped zone of the opposite conductivity type from the semiconductor layer enclosed by said semiconductor layer and spaced from the memory element, and wherein the leads extend in said strongly doped zone.

9. A fixed data memory as claimed in claim 8, further comprising at least one blocking *pn* junction formed between the strongly doped zone and the memory elements.

* * * * *